(12) United States Patent
Helovuo

(10) Patent No.: US 8,527,971 B2
(45) Date of Patent: Sep. 3, 2013

(54) PARALLEL PROGRAM GENERATION METHOD

(75) Inventor: Juhana Helovuo, Tampere (FI)

(73) Assignee: Atostek Oy, Tampere (FI)

( * ) Notice: Subject to any disclaimer, the term of this patent is extended or adjusted under 35 U.S.C. 154(b) by 1250 days.

(21) Appl. No.: 12/295,600

(22) PCT Filed: Mar. 30, 2006

(86) PCT No.: PCT/FI2006/000101
§ 371 (c)(1),
(2), (4) Date: Dec. 1, 2008

(87) PCT Pub. No.: WO2007/113369
PCT Pub. Date: Oct. 11, 2007

(65) Prior Publication Data
US 2010/0306750 A1    Dec. 2, 2010

(51) Int. Cl.
G06F 9/45 (2006.01)

(52) U.S. Cl.
USPC ............ 717/149; 717/144; 717/152; 717/159

(58) Field of Classification Search
None
See application file for complete search history.

(56) References Cited

U.S. PATENT DOCUMENTS

| | | | | |
|---|---|---|---|---|
| 5,721,928 A * | 2/1998 | Umehara et al. | | 717/149 |
| 6,820,223 B2 * | 11/2004 | Heishi et al. | | 714/38.13 |
| 7,917,899 B2 * | 3/2011 | Ota et al. | | 717/152 |
| 2002/0042907 A1 | 4/2002 | Yamanaka et al. | | |
| 2003/0079114 A1 * | 4/2003 | Heishi et al. | | 712/213 |
| 2004/0083468 A1 | 4/2004 | Ogawa et al. | | |
| 2004/0172626 A1 * | 9/2004 | Jalan et al. | | 717/149 |
| 2004/0194074 A1 | 9/2004 | Shibayama et al. | | |
| 2005/0108695 A1 * | 5/2005 | Li et al. | | 717/144 |
| 2005/0188364 A1 * | 8/2005 | Cockx et al. | | 717/159 |
| 2009/0049433 A1 * | 2/2009 | Li et al. | | 717/149 |

FOREIGN PATENT DOCUMENTS

EP    1 378 825 A1    1/2004

OTHER PUBLICATIONS

Grune, D., et al., Modern Compiler Design, John Wiley & Sons, New York, Mar. 2001, 10 pages.*
Banerjee, U., et al., Automatic Program Parallelization, Proceedings of the IEEE, vol. 81, Issue 2, Feb. 1993, pp. 211-243, [retrieved on Jun. 13, 2013], Retrieved from the Internet: <URL:http://ieeexplore.ieee.org/>.*
Gasper, P., et al., Automatic Parallelization of Sequential C Code, 2003, 11 pages, [retrieved on Apr. 26, 2012], Retrieved from the Internet: <URL:http://citeseer.ist.psu.edu/index>.*
Terrano et al., "Using an Architectural Knowledge Base to Generate Code for Parallel Computers," Communications for the ACM, vol. 32, Issue 9, 1989, pp. 1065-1072.
Amme et al., "Data Dependence Analysis of Assembly Code," INRIA, Rapport de recherche, No. 3764, Sep. 1999.
Cattell et al., "Code Generation in a Machine-independent Compiler," Proceedings of the 1979 SIGPLAN symposium on Compiler construction, 1979.
Beck et al., "Architecture-dependent partitioning of dependence graphs." Parallel and Distributed Processing, 1998.

* cited by examiner

*Primary Examiner* — Thuy Dao
*Assistant Examiner* — Geoffrey St Leger
(74) *Attorney, Agent, or Firm* — Muncy, Geissler, Olds & Lowe, PLLC

(57) ABSTRACT

A method for compiling a source code into a parallel executable form, in which the execution order of the executable is partially undefined. During the compilation process a partial execution order is first defined for instructions having ordering constraints related to the source code level. The partial execution order is then completed with architecture related ordering constraints in order to produce an executable code.

11 Claims, 4 Drawing Sheets

(a) A sequential, or linear order, no parallelism (b) A partial order, some parallelism (c) A partial order, more parallelism

PARALLEL PROGRAM GENERATION METHOD

FIELD OF THE INVENTION

The invention relates to parallel program generation. The invention relates particularly to generating computer programs for a computer having a plurality of processors or a plurality of processing units or cores within one processor so that the computer is capable of executing a plurality of instructions concurrently.

BACKGROUND OF THE INVENTION

In the early days computers had only one processor that was capable of executing sequential programs. When a new processor was manufactured it usually was faster. This was achieved by raising the clock frequency of the processor so that it was capable of executing more instructions per second. Another important way was to optimize the instruction set of the processor so that the instructions would require less clock cycles to execute. However, this was soon recognized inadequate because of the increase in the computing needs.

This problem has been approached by introducing parallel computing environments. There are several different approaches. The traditional ones include having multiple processors within one computer and computing networks having multiple computing nodes. Lately new processors having multiple computing units within one processor have been introduced. One computing unit might be capable of executing several instructions concurrently. By combining these, one can construct a computing network in which the node computers comprise a plurality of processors that are capable of executing multiple instructions concurrently. A node computer can execute tens of instructions concurrently and this number is expected to be rising in the future. The biggest computing networks comprise thousands of computers. Thus, the computing networks might be able to execute more than tens of thousands of instructions concurrently.

To allow an efficient parallel execution of instructions, the programs of such computers must be designed to be executed in parallel. There are two different traditional solutions to overcome this problem. It is possible to parallelize a sequential program automatically while compiling. The better solution is that the programmer designs the program so that it actually comprises a plurality of sequential programs that can communicate with each other so that the actual task will be executed in parallel. However, even in this case the sequential programs are sequential and they must be further parallelized for obtaining the best possible result.

An example of an automatic parallelization is disclosed, for example, in U.S. Pat. No. 6,622,302. The drawback of this solution is that the parallelization of a sequential program is a very difficult task. Thus, it is time and resource consuming and still it is impossible to reach the perfect solution. Because of this, the automatic parallelization and other automatic optimization are trade-offs between the code quality and the use of resources.

Examples of traditional concurrent programming in which a plurality of sequential programs are used, can be found, for example, from the book "Concurrent programming: principles and practice" written by Gregory R. Andrews and published by Addison-Wesley in 1991. The drawback of this method is that the design process of the program is more complicated and time consuming and it requires special knowledge.

These methods can be combined. An example of this has been disclosed in U.S. Pat. No. 6,993,753. However, the combination does not solve the fundamental problems of these methods.

PURPOSE OF THE INVENTION

The purpose of the invention is to provide a new and efficient method for producing parallel programs and tools for implementing the method

SUMMARY OF THE INVENTION

The invention discloses a method for compiling a computer program from a source code into an executable code according to the characterization portion of independent claim 1. The invention can be implemented as a software product and an apparatus according to the independent claims 7 and 13. Further embodiments are disclosed in the dependent claims.

In the method first a source code is produced. The source code can be produced by a programmer or a programming tool. The produced source code is such that the execution order is defined only between instructions that have such data dependencies between each other that their execution must be ordered. An example of such dependency is a computation that will produce a result to be used as an input for the next computation. The execution order for the rest of the instructions remains undefined until the executable program will be executed in a computing device. If the architecture of the computing device does not allow defining the execution order at run time, the execution order can be decided as the last step of the compilation. The execution order is then decided according to the capabilities of the computing device. Furthermore, the invention discloses a computer software product for producing such an executable form.

In an embodiment the executable form is produced from the source code by performing following steps. Firstly the source code is parsed for defining an abstract parse tree. The abstract parse tree is then synthesized for defining data flow and data dependency graphs. These graphs are then refined into machine data flow graph in order to form ordering constraints. Then a partial execution order will be defined with a first portion of the ordering constraints, wherein the first portion of the ordering constraints consists of the ordering constraints necessary to satisfy the dependencies in the data flow and dependency graphs. Then the instructions in the machine data flow graph are grouped into parallel executable code by adding a second portion of ordering constraints, wherein the second portion of the ordering constraints consists of ordering constraints necessary to map the machine data flow graph to a computation device. Lastly, the executable form will be produced.

In a typical case some parts of the code must be executed in a certain order in order to comply with the dependencies in the source code. Some parts of the code are not ordered by the dependencies and can be executed in parallel. Parallel executable code consists of instructions and ordering constraints between them. Instructions describe what are the steps of the computation. Ordering constraints describe in which order the instructions must be executed. A portion of the ordering constraints is prescribed by the source program and a second portion of ordering constraints may be necessary to fit the program into an execution hardware. By maintaining a separation between these two portions, it is possible to decide the execution order as late as possible and increase the degree of parallelism.

In prior art solutions the execution order is decided early and no distinction between the two portions of ordering constraints is made. Automated optimizations are based on removing a part of these already decided execution order constraints. A prerequisite of safe constraint removal is the classification of constraints into the aforementioned two portions. This is a very complex operation. A benefit of the invention is that there is no need for the removal of the ordering constraints and the very complex operation can be avoided. Thus, in addition to the increase of the efficiency of the produced executable, there is also an increase in producing the executable as the compilation process is simplified.

A further benefit of the invention is that it will be easier to produce parallel programs which are capable of harnessing the full capabilities of parallel computing devices. The same source code will give good performance in different devices that can execute a number of different instructions concurrently.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
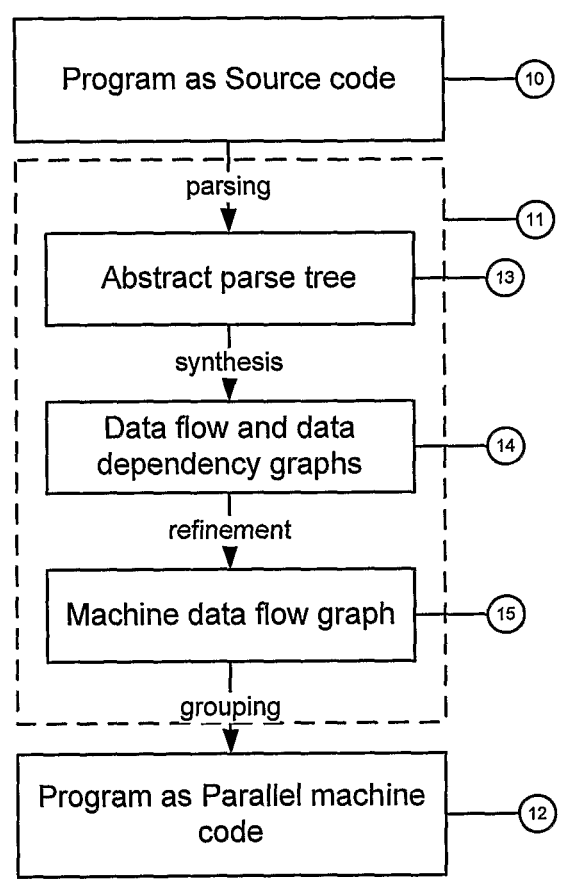
FIG. 1 is a flow chart of a compilation method according to the present invention.

In FIG. 1 a flow chart of a compilation method according to the present invention is disclosed. In FIG. 1 a source code of a computer program 10 is compiled by using a compilation process 11 according to the present invention. The compilation process is initiated by forming an abstract parse tree 13. The forming of the abstract parse tree is similar to conventional methods. During the compilation process first data flow and data dependency graphs 14 are formed. These graphs are then refined to form a machine data flow graph 15. Based on these graphs, the compilation process produces an executable parallel form of the program. This is achieved by grouping the instructions of the code so that the blocks that do not have dependencies forcing a particular execution order are maintained without a specific execution order. The execution order is decided later when the program is executed in a computing device. Defining the specific execution order can be done automatically or by the programmer. It is possible to analyze the dependency graphs for finding the instructions that must be executed in a certain order. Furthermore, it is possible to add further instructions to the programming language that indicate a portion of the source code that must be compiled to a sequential form.

Figure 2:
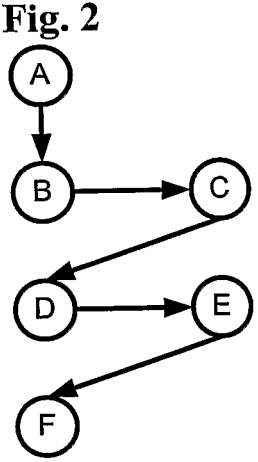
FIG. 2 illustrates the level of parallelism according to the present invention.
Figure 2:
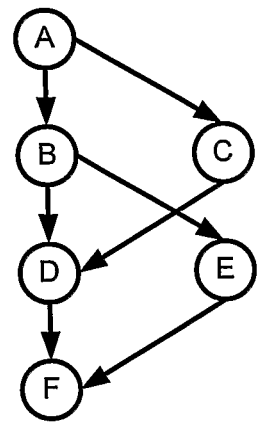
Figure 2:
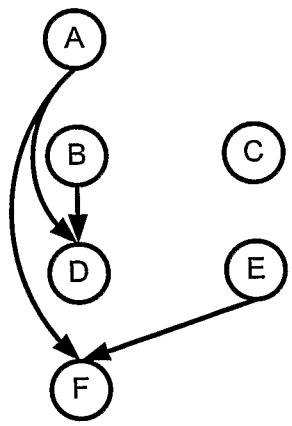

In FIG. 2 differences between the sequential order and partially concurrent orders are disclosed. The aim of the invention is as parallel an order as possible. The traditional methods are described by case (a), in which the program is completely sequential. Situation (b) includes a little more parallel execution, but the aim of the present invention is to produce maximally parallel programs according to case (c).

Figure 3:
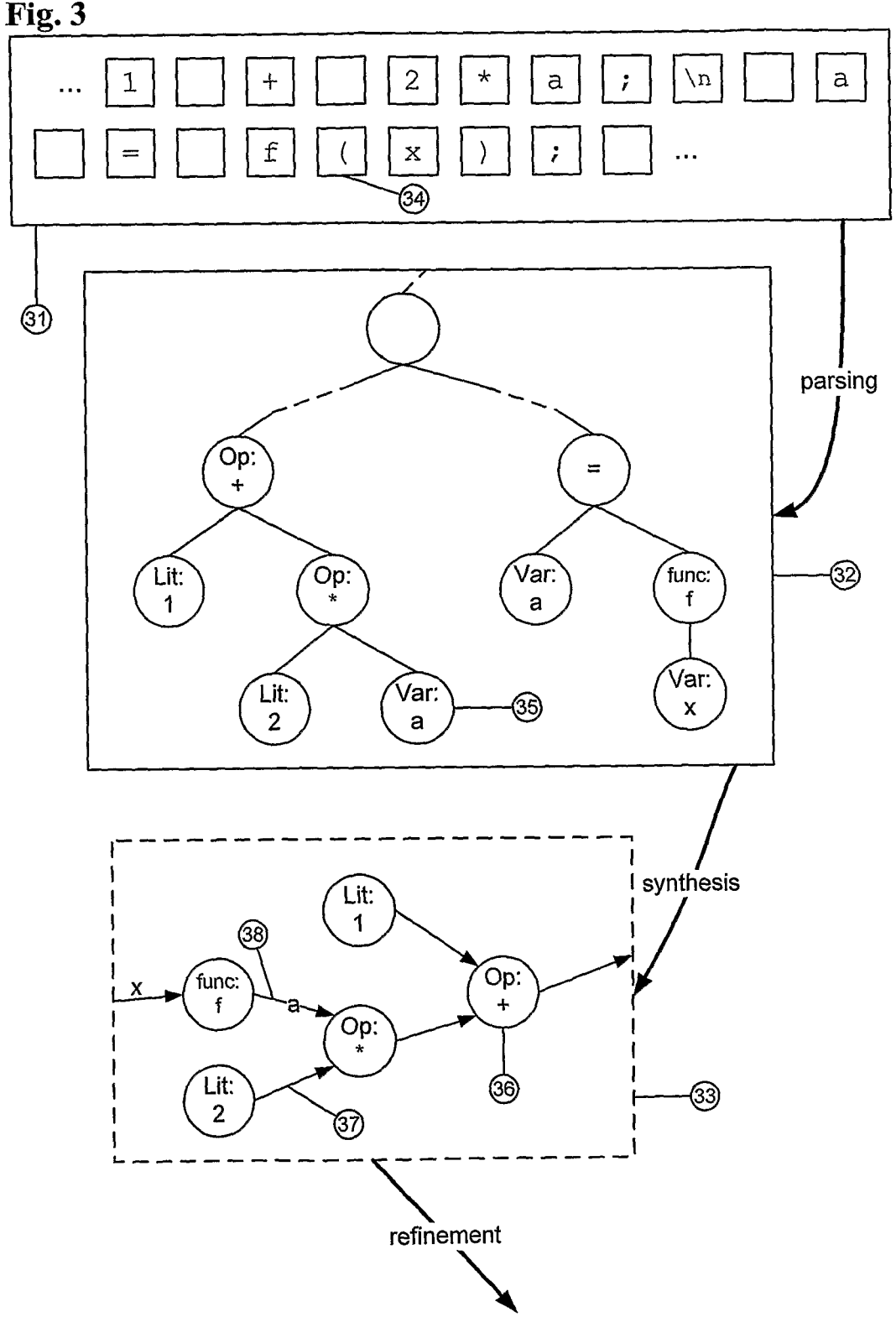
FIG. 3 illustrates a compilation method according to the present invention.

FIG. 3 discloses an example operation of a method according to the present invention. The method according to the present invention requires a source code 31 to be used as an input. The source code 31 is a regular source code that is in human readable text format and comprises programming language instructions formed from characters and different symbols 34. The source code 31 is then parsed and turned into abstract parse tree form 32. This abstract parse tree 32 is then synthesized into a data flow and data dependency graphs 33 so that instructions and constant values of the program are represented by the nodes 36 of the graph. Variables that are used for temporary storing of data values are represented by data dependencies 37, 38 or data flows between the nodes. Data dependencies and data flows can be named 38 or unnamed 37. In data dependency and data flow graphs, the nodes are computing operations and the arches between the nodes disclose data transfer between the nodes and the required computation order.

Figure 4:
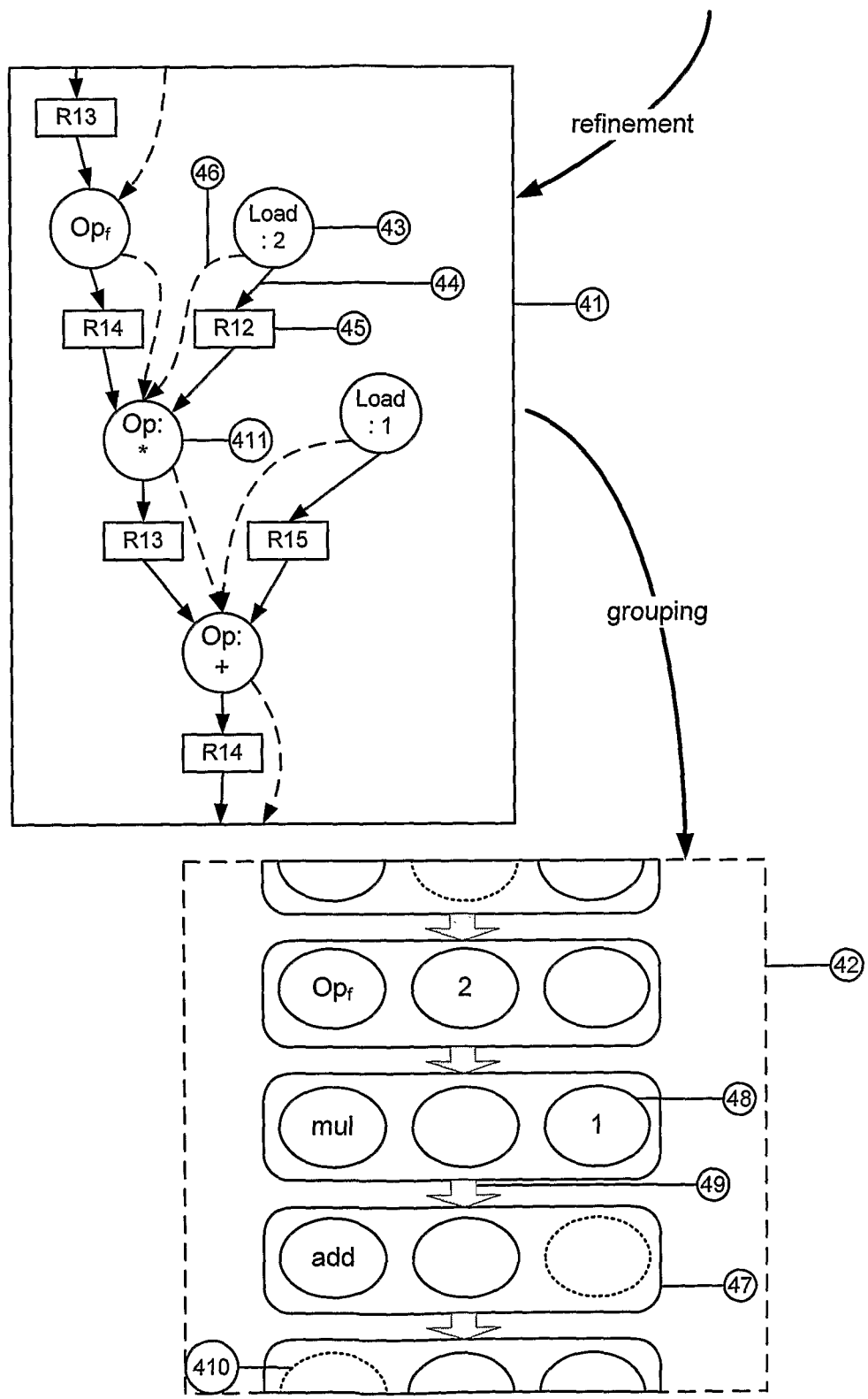
FIG. 4 illustrates a refinement process according to the present invention.

FIG. 4 discloses the refinement step according to the present invention. In this step the graph 33 will be split into smaller portions if they represent operations that cannot be translated into a single machine language instruction. In splitting any instruction that is removed will be replaced by a group of machine language instructions, which group is arranged to perform the same functionality. Furthermore, when two machine level instructions 43, 411 have a direct dependency, a storage location 45 is defined. Then the storage location 45 is used for storing a result value produced by the first operation 43 so that the later dependent operation 411 can use the result value as an input.

As a result of the splitting procedure a machine data dependency graph 41 is achieved. It comprises machine level instructions 43, 411, storage locations 45, reference dependencies 44 between the machine level instructions and storage locations and ordering constraints 46 between the operations. The machine level instructions define which computations the program includes. The storage locations define which storage locations the program uses. The reference dependencies define from which location each machine level instruction retrieves and to which location each instruction stores data. The ordering constraints define requirements for the execution order of the instructions.

Lastly, the executable program is generated by grouping the machine data dependency graph 41 into parallel machine level code 42. The machine level code 42 representation comprises sequences of machine code instruction groups 47. Each of the groups comprises at least one machine code instruction 48 that can be executed concurrently. Within a group the instructions can be defined to be executed at the same time or in an undefined order. The groups are executed in a order in which they are introduced. In some cases the target architecture requires the groups to be equal in size. In this case, the groups must be filled if they do not fulfill the requirement naturally.

A preferred embodiment of the present invention is a software product arranged to produce parallel computer programs from a source code by using the above described compilation method.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for compiling a computer program from a source code into an executable code, the method comprising the steps of:
   parsing the source code for defining an abstract parse tree;
   synthesizing said abstract parse tree for defining data flow and data dependency graphs;
   refining said data flow and data dependency graphs into a machine data flow graph in order to form ordering constraints;
   defining a partial execution order with a first portion of the ordering constraints prescribed in the source code, wherein the first portion of the ordering constraints consists of the ordering constraints necessary to satisfy the dependencies in said data flow and data dependency graphs;
   grouping instructions in said machine data flow graph into parallel executable code by adding a second portion of ordering constraints, wherein the second portion of the ordering constraints consists of ordering constraints necessary to map said machine data flow graph to a computation device; and
   producing an executable form from said parallel executable code;
   wherein the method further comprises a step of defining a final execution order for said parallel executable code when said parallel executable code is executed in a computing device or in said step of grouping instructions.

2. The method according to claim 1, wherein said groups are executed in the order of introduction.

3. A computer program product stored in a memory for compiling a computer program from a source code into an executable code, which computer program product is arranged to execute the following steps when executed in a computing device:
   parsing the source code for defining an abstract parse tree;
   synthesizing said abstract parse tree for defining data flow and data dependency graphs;
   refining said data flow and data dependency graphs into a machine data flow graph in order to form ordering constraints;
   defining a partial execution order with a first portion of the ordering constraints prescribed in the source code, wherein the first portion of the ordering constraints consists of the ordering constraints necessary to satisfy the dependencies in said data flow and data dependency graphs; and
   grouping instructions in said machine data flow graph into parallel executable code by adding a second portion of ordering constraints, wherein the second portion of the ordering constraints consists of ordering constraints necessary to map said machine data flow graph to a computation device; and
   producing an executable form from said machine data flow graph;
   wherein the steps further comprise a step of defining a final execution order for said parallel executable code when said parallel executable code is executed in a computing device or in said step of grouping instructions.

4. The computer program product according to claim 3, wherein the computer program product is further arranged to execute a step of defining an execution order for a portion of said parallel executable code according to said second portion of ordering constraints in said step of producing an executable form.

5. The computer program product according to claim 4, wherein said groups are executed in the order of introduction.

6. An apparatus comprising a computer program product stored in a memory for compiling a computer program from a source code into an executable code, which apparatus is arranged to perform the following steps when executing said computer program product:
   parsing the source code for defining an abstract parse tree;
   synthesizing said abstract parse tree for defining data flow and data dependency graphs;
   refining said data flow and data dependency graphs into a machine data flow graph in order to form ordering constraints;
   defining a partial execution order with a first portion of the ordering constraints prescribed in the source code, wherein the first portion of the ordering constraints consists of the ordering constraints necessary to satisfy the dependencies in said data flow and data dependency graphs;
   grouping instructions in said machine data flow graph into parallel executable code by adding a second portion of ordering constraints, wherein the second portion of the ordering constraints consists of ordering constraints necessary to map said machine data flow graph to a computation device; and
   producing an executable form from said machine data flow graph;
   wherein the steps further comprise a step of defining a final execution order for said parallel executable code when said parallel executable code is executed in a computing device or in said step of grouping instructions.

7. The apparatus according to claim 6, wherein the apparatus is further arranged to perform a step of defining an execution order for a portion of the parallel executable code according to said second portion of ordering constraints when said parallel executable code is executed in a computing device.

8. The apparatus according to claim 7, wherein said groups are formed from said first and second portions of ordering constraints.

9. The apparatus according to claim 6, wherein the apparatus is further arranged to perform a step of defining an execution order for a portion of the parallel executable code according to said second portion of ordering constraints in said step of producing an executable form.

10. The apparatus according to claim 9, wherein said groups are executed in the order of introduction.

11. The apparatus according to claim 9, wherein said groups are formed from said first and second portions of ordering constraints.

* * * * *